READER-COPIER SERIAL-NUMBERING DEVICE

Original Filed Nov. 20, 1964

12 Sheets-Sheet 1

INVENTORS:
IRA M. SAGE
PETER P. PUNGITORE
PETER J. TOTINO
BY Curtis, Morris & Safford
ATTORNEYS INVENTORS:
IRA M. SAGE
PETER P. PUNGITORE
PETER J. TOTINO
BY Curtis, Morris & Safford
ATTORNEYS

READER-COPIER SERIAL-NUMBERING DEVICE

Original Filed Nov. 20, 1964 12 Sheets-Sheet 3

INVENTORS:
IRA M. SAGE
PETER P. PUNGITORE
PETER J. TOTINO
BY Curtis, Morris & Safford
ATTORNEYS

READER-COPIER SERIAL-NUMBERING DEVICE

Original Filed Nov. 20, 1964 12 Sheets-Sheet 4

INVENTORS:
IRA M. SAGE
PETER P. PUNGITORE
BY PETER J. TOTINO
BY Curtis, Morris & Safford
ATTORNEYS INVENTORS:
IRA M. SAGE
PETER P. PUNGITORE
PETER J. TOTINO
BY Curtis, Morris & Safford
ATTORNEYS

READER-COPIER SERIAL-NUMBERING DEVICE

Original Filed Nov. 20, 1964

INVENTORS:
IRA M. SAGE
PETER P. PUNGITORE
PETER J. TOTINO
BY Curtis, Morris & Safford
ATTORNEYS.

READER-COPIER SERIAL-NUMBERING DEVICE

Original Filed Nov. 20, 1964 12 Sheets-Sheet 7

INVENTORS:
IRA M. SAGE
PETER P. PUNGITORE
PETER J. TOTINO
BY Curtis, Morris & Safford
ATTORNEYS

READER-COPIER SERIAL-NUMBERING DEVICE

INVENTORS:
IRA M. SAGE
PETER P. PUNGITORE
PETER J. TOTINO
BY Curtis, Morris & Safford
ATTORNEYS INVENTORS:
IRA M. SAGE
PETER P. PUNGITORE
PETER J. TOTINO
BY Curtis, Morris & Safford
ATTORNEYS

READER-COPIER SERIAL-NUMBERING DEVICE

INVENTORS:
IRA M. SAGE
PETER P. PUNGITORE
PETER J. TOTINO
BY Curtis, Morris & Safford
ATTORNEYS Sept. 1, 1970 I. M. SAGE ET AL 3,526,456

READER-COPIER SERIAL-NUMBERING DEVICE

Original Filed Nov. 20, 1964 12 Sheets-Sheet 11

INVENTORS:
IRA M. SAGE
PETER P. PUNGITORE
PETER J. TOTINO

BY Curtis, Morris & Safford
ATTORNEYS

READER-COPIER SERIAL-NUMBERING DEVICE

Original Filed Nov. 20, 1964 12 Sheets-Sheet 12

INVENTORS:
IRA M. SAGE
PETER P. PUNGITORE
PETER J. TOTINO
BY Curtis, Morris & Safford
ATTORNEYS

United States Patent Office 3,526,456

Patented Sept. 1, 1970

3,526,456

READER-COPIER SERIAL-NUMBERING DEVICE

Ira M. Sage, New York, and Peter P. Pungitore, Bronx, N.Y., and Peter J. Totino, Edgewater, N.J., assignors to Old Town Corporation, Brooklyn, N.Y., a corporation of New York Original application Nov. 20, 1964, Ser. No. 412,729, now Patent No. 3,385,161, dated May 28, 1968. Divided and this application Dec. 20, 1967, Ser. No. 716,248

Int. Cl. G03b *27/70*

U.S. Cl. 355—4 4 Claims

ABSTRACT OF THE DISCLOSURE

A reader-copier which enlarges microfilm images, displays them on a large viewing screen, and make electrostatic copies of the images. The device provides a serial number for each copy being made, and displays that serial number on the viewing screen while simultaneously projecting it upon the copy paper so as to provide a permanent impression of the serial number on the copy paper (see FIGS. 15 and 16).

This is a division of U.S. application Ser. No. 412,729, filed Nov. 20, 1964 now U.S. Pat. No. 3,385,161 issued May 28, 1968.

This invention relates to apparatus for displaying and copying documents; more particularly, this invention relates to apparatus for enlarging, displaying and copying dcouments recorded on microfilm.

It is an object of the present invention to provide a microfilm reader-copier which enlarges and displays documents recorded on the microfilm and quickly makes dry copies of selected portions of the documents.

Another object of the present invention is to provide novel means for setting the length of the copies made by said reader-copier to correspond to the length of the selected portion of the document copied.

It is yet another object of the present invention to provide electrostatic copying equipment for such apparatus, the copying equipment being relatively fool-proof and maintenance-free.

Still another object of the present invention is to provide, for use in such equipment, novel brush apparatus for applying developer powder to develop latent electrostatic images clearly and cleanly.

A further object of the present invention is to provide novel means for introducing additional developer powder to the brush as the developer powder supply is depleted.

A still further object of the present invention is to provide novel means for quickly and efficiently mixing such developer powder with carrier particles used in applying the developer powder to the latent electrostatic images.

It is another object of the present invention to provide novel means for making electrostatic copies of stationary documents.

Still another object of the present invention is to provide novel means for cutting roll-fed copier paper into desired lengths in a manner such as to minimize the possibility of the paper jamming in the copying equipment.

A further object of the present invention is to provide novel means for identifying copies made in a microfilm reader-copier.

The drawings and description that follow describe the invention and indicate some of the ways in which it can be used. In addition, some of the advantages provided by the invention will be pointed out.

OVERALL OPERATION

Figure 1:
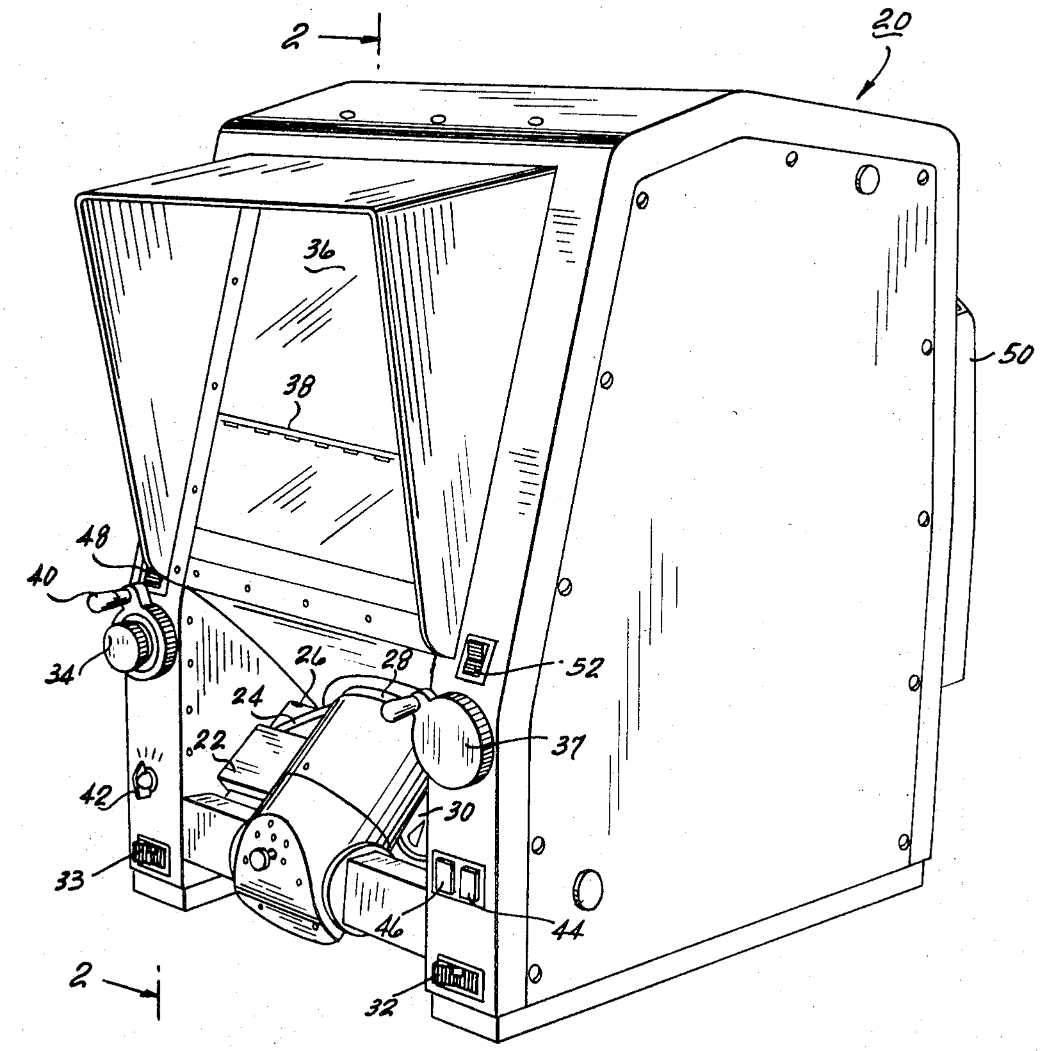
FIG. 1 is a perspective view of a microfilm reader-copier made in accordance with the present invention.

The overall operation and performance of the reader-copier machine of the present invention now will be explained with reference to FIG. 1. The reader-copier 20 is designed to be used on top of a table with an operator seated in front of it. The operator places a magazine 22 of microfilm 24 on a turntable 26 and threads the microfilm 24 through a rotatable projector assembly 28 and onto a take-up reel 30 which also is mounted on the turntable 26.

The machine 20 is turned on by means of an on-off switch 32. This lights the projector lamp and displays an image of the microfilm document on a viewing screen 36. Then, the operator turns a microfilm alignment knob 34 which causes the projector mechanism 28 and turntable 26 to rotate a full 360° to any desired position in order to align the image appearing on screen 36 in a vertical position regardless of the angle at which the document originally was recorded on the microfilm.

A scanning knob 37 is provided. It may be turned to move the microfilm 24 through the projector apparatus 28 until the frame containing the desired document appears on screen 36.

In accordance with the present invention, a horizontal editing bar 38 is positioned on the inside surface of viewing screen 36. An editing knob or crank 40 is provided so that the operator may move the editing bar 38 up and down screen 36. As will be described in greater detail hereinafter, apparatus is provided in the reader-copier 20 for copying only that portion of the image that appears on screen 36 above the editing bar 38. Thus, by turning editing crank 40, the operator may select a given section of the document for copying and is not forced to copy the whole microfilm frame being viewed on screen 36.

When the operator has found the frame desired and has positioned the editing bar 38, he may automatically print the desired portion of the document merely by setting a rotary selector switch to obtain the exposure time desired ("long" or "short" exposure), and then pressing automatic print button 44. In accordance with the present invention, the selected portion of the document will be printed automatically on a continuous web of copy paper and the length of paper used in making the copy will correspond directly to the distance from the upper edge of editing bar 38 to the top of screen 36.

If manual control of the exposure time is desired, the selector switch 42 is turned to the manual operation position, manual print button 46 is pushed and held in for the length of exposure time desired, and is then released. The copying operation then will proceed automatically as described above.

If desired, the above operation can be repeated immediately so as to record a selected portion of another document closely adjacent to the copy of the first document on the continuous web of copy paper. This feature can be very advantageous in many operations such as those in which it is desired to make a single compact record of many different short microfilm entries. This can give very significant savings in copy-making time, in copy paper costs, and gives a very compact copy which is easy to use.

When a desired record has been completed, it may be cut off by pressing rocker-type switch 48 upwardly. As further copy-making proceeds, the cut copy will emerge from the rear of the machine 20 and will be deposited in a hopper 50 at the rear of the machine. If it is desired to obtain the cut copy immediately, rocker switch 48 may be pressed downwardly and the cut copy will be fed into hopper 50 immediately.

In accordance with the present invention, novel means are provided for identifying each copy made by the reader-copier machine. When desired, a serial number is automatically printed at the beginning or end of a given copy. This may be accomplished merely by moving edit bar 38 close to the top of screen 36, setting selector switch 42 to the "automatic numbering" position, and then pressing the automatic "print" button 44. The number will be printed on a short length of copy paper either preceding or following the copy to be identified with the number. The serial number may be increased one digit by pressing rocker switch 52 downwardly, and may be displayed at the lower edge of screen 36 by pressing rocker switch 52 upwardly. The number is similarly displayed while being copied.

A reset switch 53 is provided to reset the copying apparatus in case of malfunction.

EDITING SYSTEM

Figure 2:
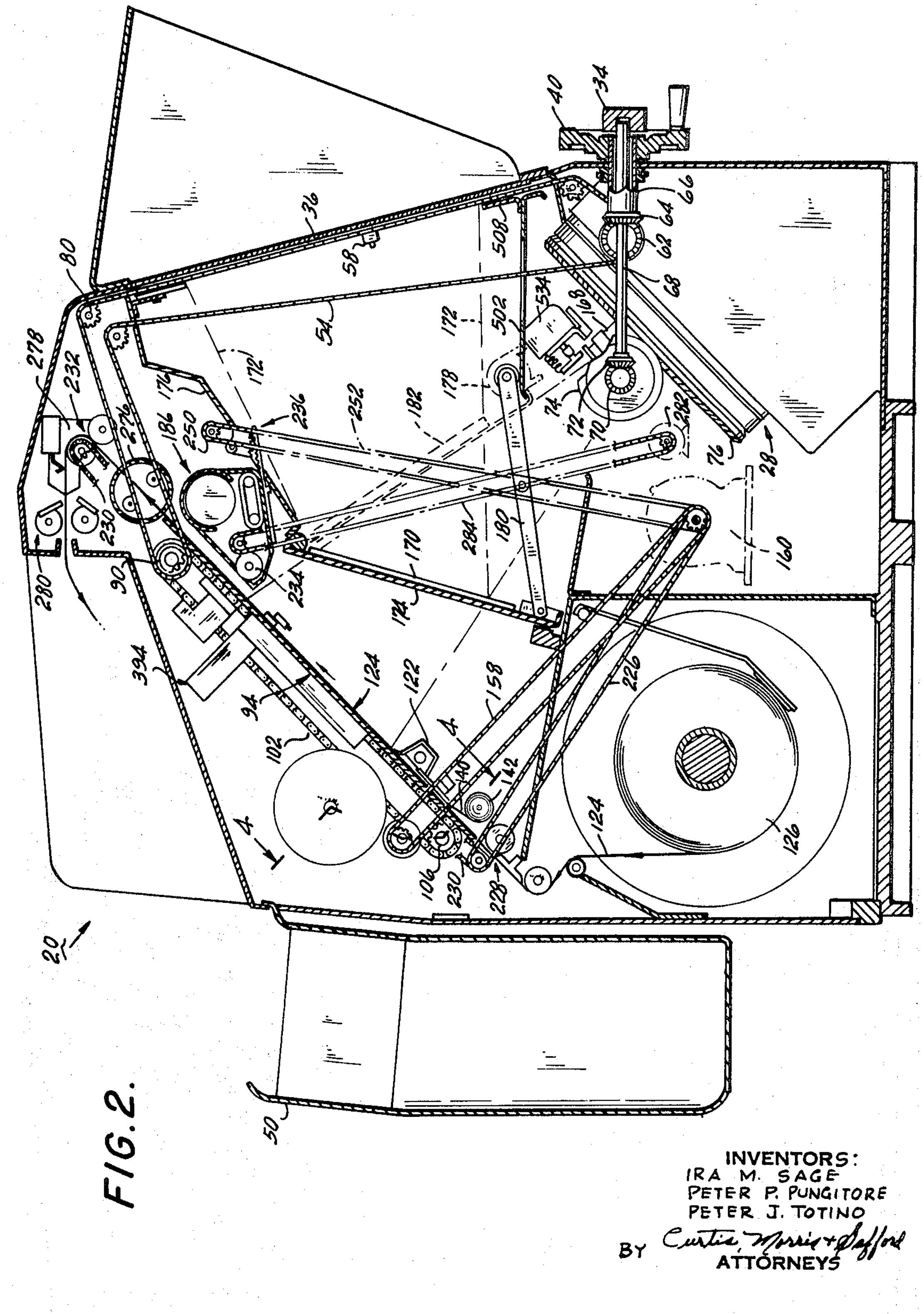
FIG. 2 is a cross-sectional and partially schematic view taken along line 2—2 of FIG. 1.
Figure 3:
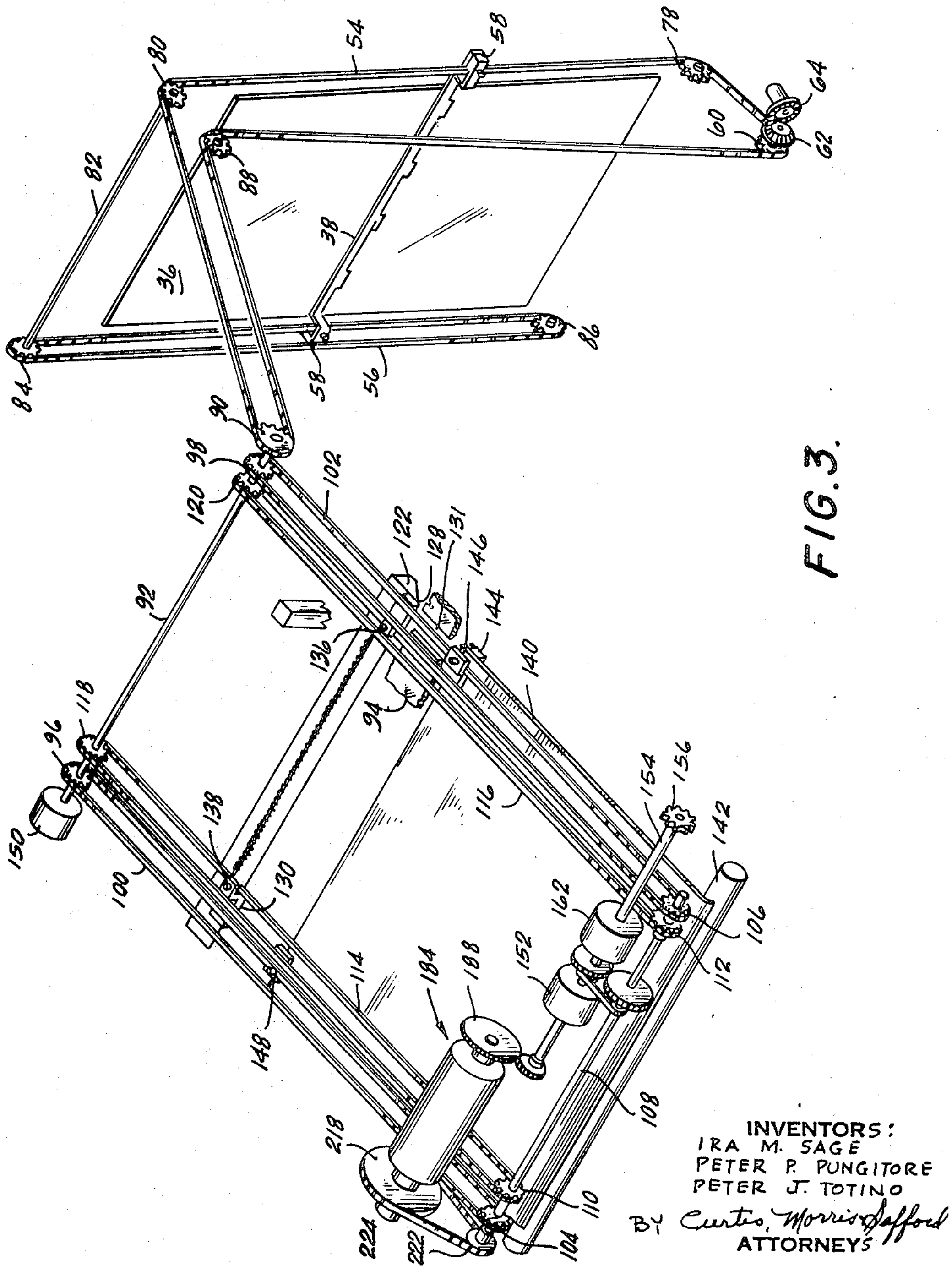
FIG. 3 is a perspective and partially schematic view of some of the components of the apparatus shown in FIGS. 1 and 2.

The system for producing edited copies of the displayed document is illustrated in FIGS. 2 through 6. Referring now to FIGS. 2 and 3, and especially to FIG. 3, editing bar 38 is clamped at its end to a pair of chains 54 and 56 by means of clamps 58. Drive chain 54 is driven upwardly and downwardly along the edge of screen 36 by a sprocket 60 which is driven by bevel gears 62 and 64, the latter of which is coupled to editing knob 40 by means of a sleeve 66 (see FIG. 2).

It should be noted that sleeve 66 rotates independently from shaft 68 to which microfilm alignment knob 34 is secured. Shaft 68 drives bevel gears 70 and 72 which, in turn, drive bevel gear 74 which mates with ring bevel gear 76 to rotate the projector assembly 28 and the turntable 24 to align the microfilm in the machine.

Referring again to FIG. 3, drive chain 54 passes over an idler sprocket 78 and a sprocket 80 at the top of screen 36 which is mounted on a shaft 82 which extends along the top of screen 36 and has a sprocket 84 secured to its other end. Editing bar drive chain 56 is driven up and down by sprocket 84 and passes over an idler sprocket 86 at the bottom of screen 36.

Drive chain 54 passes over another idler sprocket 88 and then over sprocket 90 which is attached to the end of a shaft 92 which is located at the upper end of a "printing screen" 94 over which the copy paper passes and upon which the paper is charged and exposed.

Secured to shaft 92 are "mask" drive sprockets 96 and 98 which drive mask chains 100 and 102, respectively, which are used to position a mask which will be described below. Chains 100 and 102 pass around idler pulleys 104 and 106, respectively, which are rotatably mounted on a shaft 108 located at the lower end of printing screen 94. Two sprockets 110 and 112 are secured to shaft 108 and drive charger chains 114 and 116 respectively. Chains 14 and 116 idle upon sprockets 118 and 120, respectively, which are rotatably mounted on shaft 92.

Figure 4:
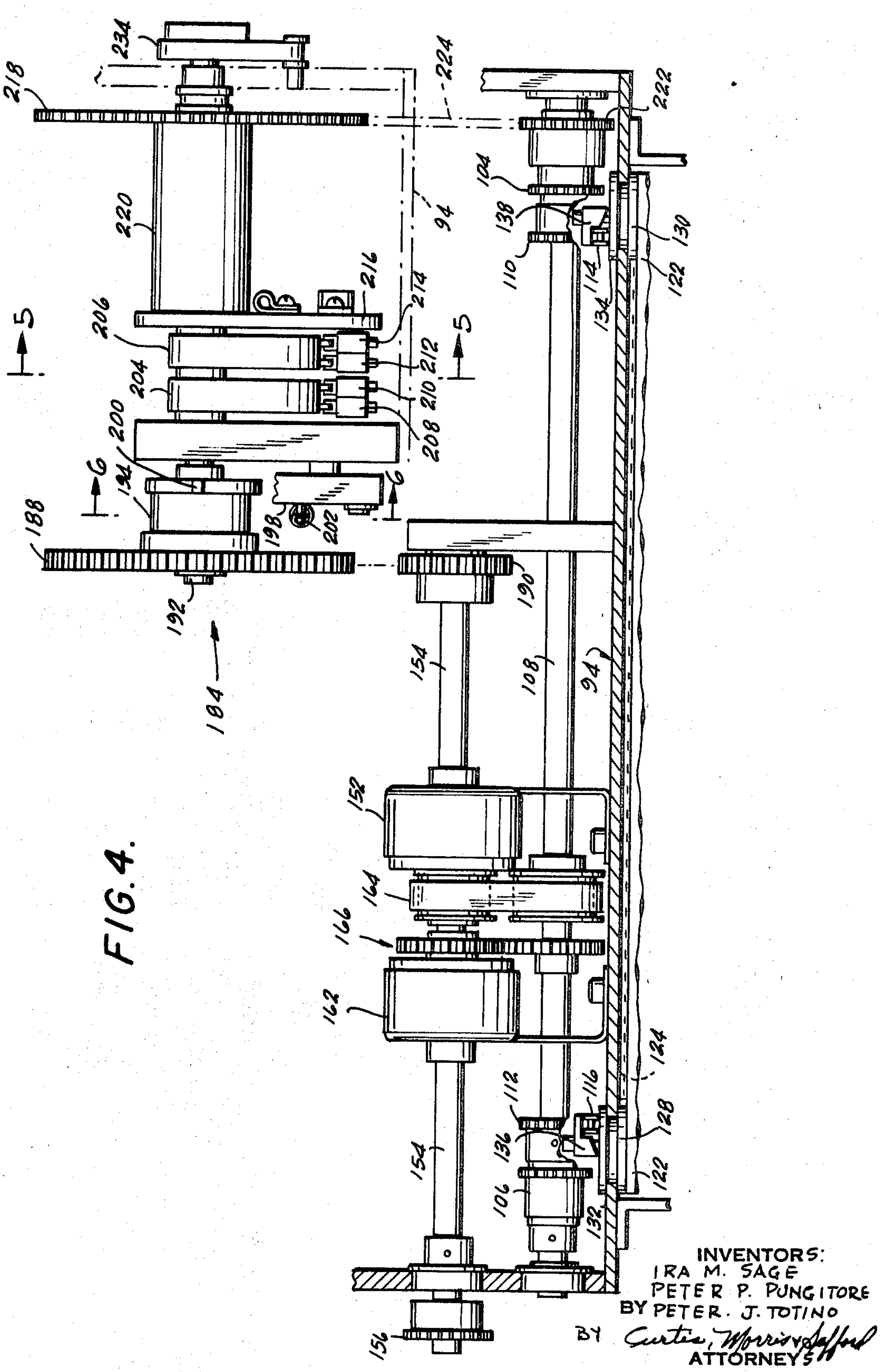
FIG. 4 is a cross-sectional view taken along line 4—4 of FIG. 2.

Referring now to FIG. 4 as well as FIG. 3, a corona charging unit 122 is provided for applying an electrostatic charge to the oxide-coated surface of electrostatically-sensitive copying paper 124 (see FIG. 2) which is fed from a roll 126 and which moves along the underside of print screen 94.

As is shown in FIGS. 3 and 4, corona charger 122 is suspended beneath print screen 94 on a pair of guide members 128 and 130. Members 128 and 130 are fitted into guide slots extending longitudinally along print screen 94 with the edges of the guide slot fitted into grooves 132 and 134 in the members 128 and 130. Members 128 and 130 are clamped to charger chains 116 and 114, respectively, by means of clamps 136 and 138.

Referring now to FIG. 3, a mask 140 is provided for covering the portion of the copy paper 124 on print screen 94 which is not needed for copying the image portion above edit bar 38. Mask 140 is moved up and down print screen 94 by the turning of edit knob 40 and thus moves in corrolation with the edit bar 38.

Mask 140 preferably is an opaque window shade which is spring-wound in a roll in a housing 142. Its leading edge is secured to a bar 144 which is fastened at its ends to guide members 146 and 148, each of which slides in one of the same slots 131 as do members 128 and 130. Guide member 146 is clamped to mask chain 102, and guide member 148 is clamped to mask chain 100.

A spring detent arrangement is provided between charger 122 and mask 140 so that the charger is releasably secured to mask 140 and follows it wherever it moves until the charger is driven away from the mask. Thus, turning the editing knob 40 has the following results: drive chain 54 is driven, editing bar 38 moves upwardly, and chain 54 drives shaft 92. This causes mask chains 100 and 102 to move the mask 140 from the lower position shown in FIG. 2 to the position shown in FIG. 3 corresponding to the position of edit bar 38 on screen 36. Mask 140 is secured by detents to charger 122 and carries the charger upwardly with it. Charger 122 is free to move with mask 140 since its chains 114 and 116 idle on shafts 92, and since at this time shaft 108 is free to rotate.

When the operator presses the print button to print the unmasked portion of the copy paper at printing screen 94, a brake 150 (FIG. 3) is actuated to lock shaft 92 and screen 140 in position. Also, a clutch 152 is engaged to couple a shaft 154 to shaft 108.

As is shown in FIG. 2, shaft 154 is driven through sprocket 156 and chain 158 by the main drive motor 160 of the reader-copier 20. The engagement of clutch 152 causes driven shaft 154 to drive shaft 108 and move charger 122 upwardly and away from mask 140. Corona charger 122 moves upwardly across the unmasked copy paper and applies an electrostatic charge to it in a manner well known in the art. When charger 122 reaches the uppermost end of its travel it strikes a limit switch which deactivates clutch 152 and energizes another clutch 162 which now causes shaft 154 to drive shaft 108 in the opposite direction and return charger 122 to the forward edge of mask 140 where it is again locked in position. At that point the charger strikes another limit switch which de-energizes clutch 162 and releases shaft 108. Clutches 152 and 162 are of standard design. Clutch 152 causes shaft 108 to be driven in one direction by means of a toothed belt 164, while clutch 162 causes shaft 108 to be driven in the opposite direction by means of a gear train 166.

In another embodiment of the invention, charger 122 makes only one charging pass over the copy paper and is not locked to mask 140. Instead, it normally rests at the top of screen 94 and makes its charging pass downwardly. It stops when it hits switches at the leading edge of the mask 140, and returns to the top of screen 94 after the copy has been completed.

In both of the above-described embodiments, the speed of copying process is considerably increased because the charger need pass over only that portion of the copy paper to be used in copying. The latter of the two charger-movement embodiments produces even faster copying since only one charging pass is used.

OPTICAL SYSTEM

Referring now to FIG. 2, when the microfilm is being viewed on screen 36, the document image is projected from the lens barrel 168 of projector assembly 28 onto a mirror 170 and is then reflected along dashed lines 172 to the screen 36. Mirror 170 is mounted on a plate 174 hinged along its upper edge to a shield plate 176 of the reader-copier machine 20. When the print button 44 on the front of the machine is pushed, an electric motor (not shown in FIG. 2) rotates a shaft 178 which is attached to a lever arrangement 180 to swing the plate 174 towards the front of the machine until it reaches the position shown by dashed lines 182. Thus, mirror 170 no longer blocks the image from reaching the printing screen 94. However, as plate 174 starts to swing forward, the projector lamp is turned off so that the document image is not projected on screen 94.

The projector lamp remains turned off while the charging operation described above is taking place. After the charger has completed its work, the projector lamp is turned on again and a document image is projected upon the copy paper at printing screen 94. The portion of the paper which is covered by mask 140 and charger 122 is not exposed. After the copy paper has been exposed for a sufficient length of time (as will be explained in greater detail below), the projector lamp is again turned off, plate 174 is swung back to its initial position, and the paper feed assembly 184 shown in FIGS. 3 through 6 is actuated to cause the latent image-bearing copy paper to move upwardly past a developer unit 186 to develop the latent image, past a fuser 276 which fuses the thermoplastic developer powder into the copy paper, through a paper cutter 280, and out of the machine.

PAPER FEEDING AND LENGTH CONTROL SYSTEM

Figures 5, 6:
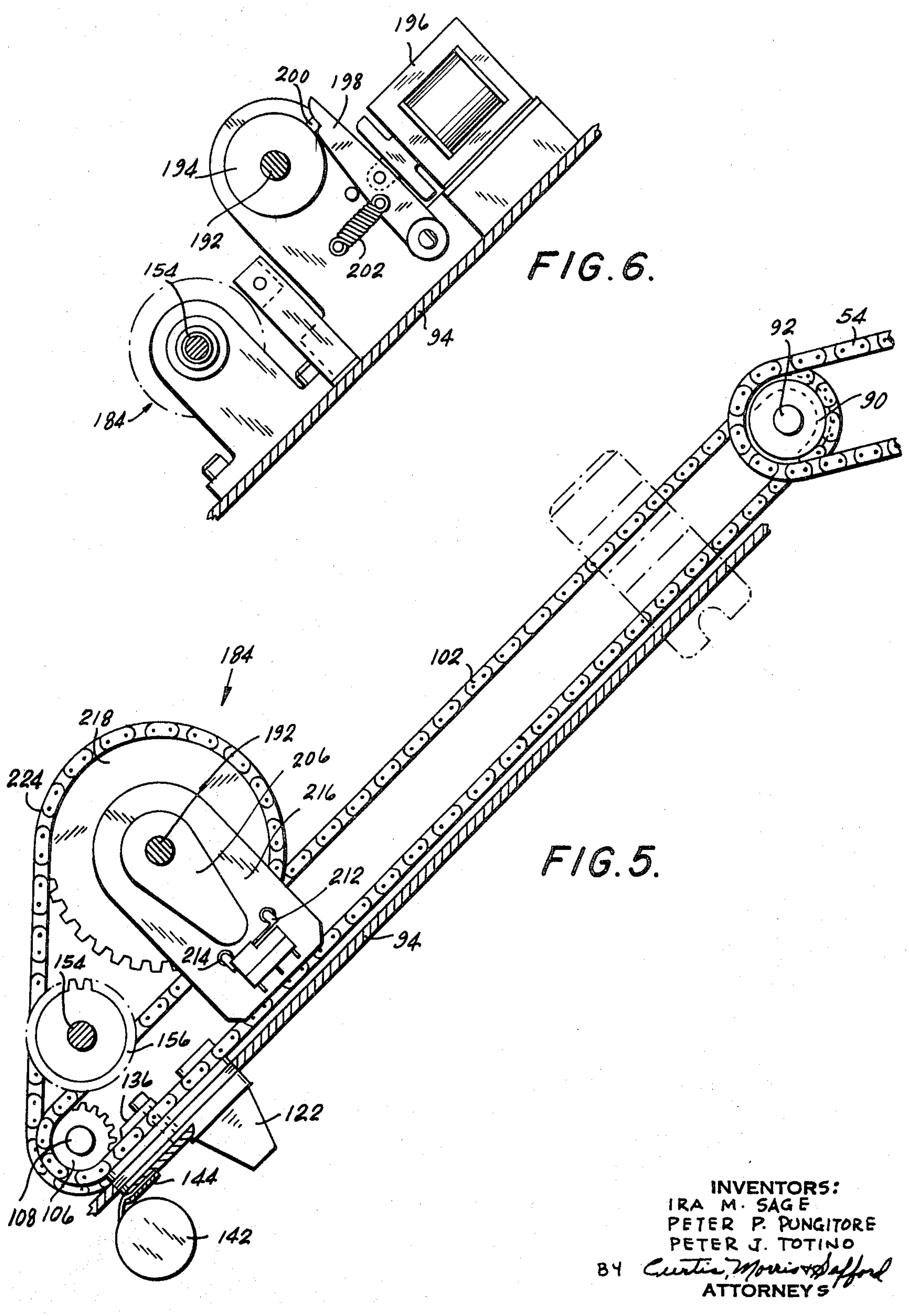
FIG. 5 is a cross-sectional view taken along line 5—5 of FIG. 4.
FIG. 6 is a cross-sectional view taken along line 6—6 of FIG. 4.

FIGS. 4 through 6 show the details of the paper feed control assembly 184 which is shown schematically in FIG. 3. It should be noted that, for the sake of clarity, control assembly 184 is shown in FIG. 4 raised from its actual position, which can best be seen in FIG. 3.

Control assembly 184 includes an input drive gear 188 which meshes with a smaller gear 190 which is secured to shaft 154. Gear 188 is driven by gear 190 whenever drive motor 160 is energized, and is rotatably mounted on a shaft 192 by means of a single-revolution "Tiny" clutch 194. Clutch 194 has a tab 200 which is normally engaged by a pawl 198 to disengage the clutch. However, after the exposure step is completed, solenoid 196 (see FIG. 6) is energized and pulls pawl 198 away from the tab 200 to engage the clutch and couple gear 188 to shaft 192. After releasing the tab 200, the solenoid 196 is de-energized, and a spring 202 returns pawl 198 to its initial position so as to engage the tab 200 when it returns to its initial position.

Two identical cams 204 and 206 are secured to shaft 192. As it rotates, the tip of cam 204 closes first one and then the other of a pair of micro-switches 208 and 210 which are firmly fixed in the position shown in FIG. 4. The tip of cam 206 similarly closes two other micro-switches 212 and 214 which are mounted on a rotatable mounting panel 216 (see FIG. 5). As will be described in greater detail below, switches 208, 210, 212 and 214 are used in timing the operation of the paper feed apparatus and other components of the copying system.

Mounting panel 216 is secured to a paper length-metering sprocket 218 by means of a hub 220. Sprocket 218 is coupled to a smaller sprocket 222 by means of a chain 224 (see FIG. 3). Sprocket 222 is rigidly attached to mask sprocket 104, and both sprockets 104 and 222 are mounted to rotate freely on shaft 108. Thus, as seen in FIG. 5, sprocket 218 and panel 216 are rotated counter-clockwise by upward movement of the mask 140 so as to reduce the elapsed time taken by cam 206 to rotate clockwise from the initial position shown to the position in which it closes switch 212. Since the closing of switch 212 stops the paper feed, this positioning of panel 16 controls the length of paper which is fed so that it corresponds to the amount of copy paper left unmasked by mask 140.

When shaft 192 first is rotated by gear 188, cam 204 closes switch 208 which actuates a paper feed clutch (not shown) on main drive motor 160. Motor 160 then starts driving a pair of paper feed rollers 228 by means of a chain 226. Another chain 230 connects the drive of rollers 228 to another pair of feed rollers 232 near the top of the reader-copier machine 20. When cam 206 closes switch 214, the paper feed clutch is disengaged and the paper feeding stops. A brake 234 is connected to shaft 192 in order to stop shaft 92 quickly after it has been released by the clutch 194.

DEVELOPER UNIT ADVANCE AND RETRACT APPARATUS

Figure 9:
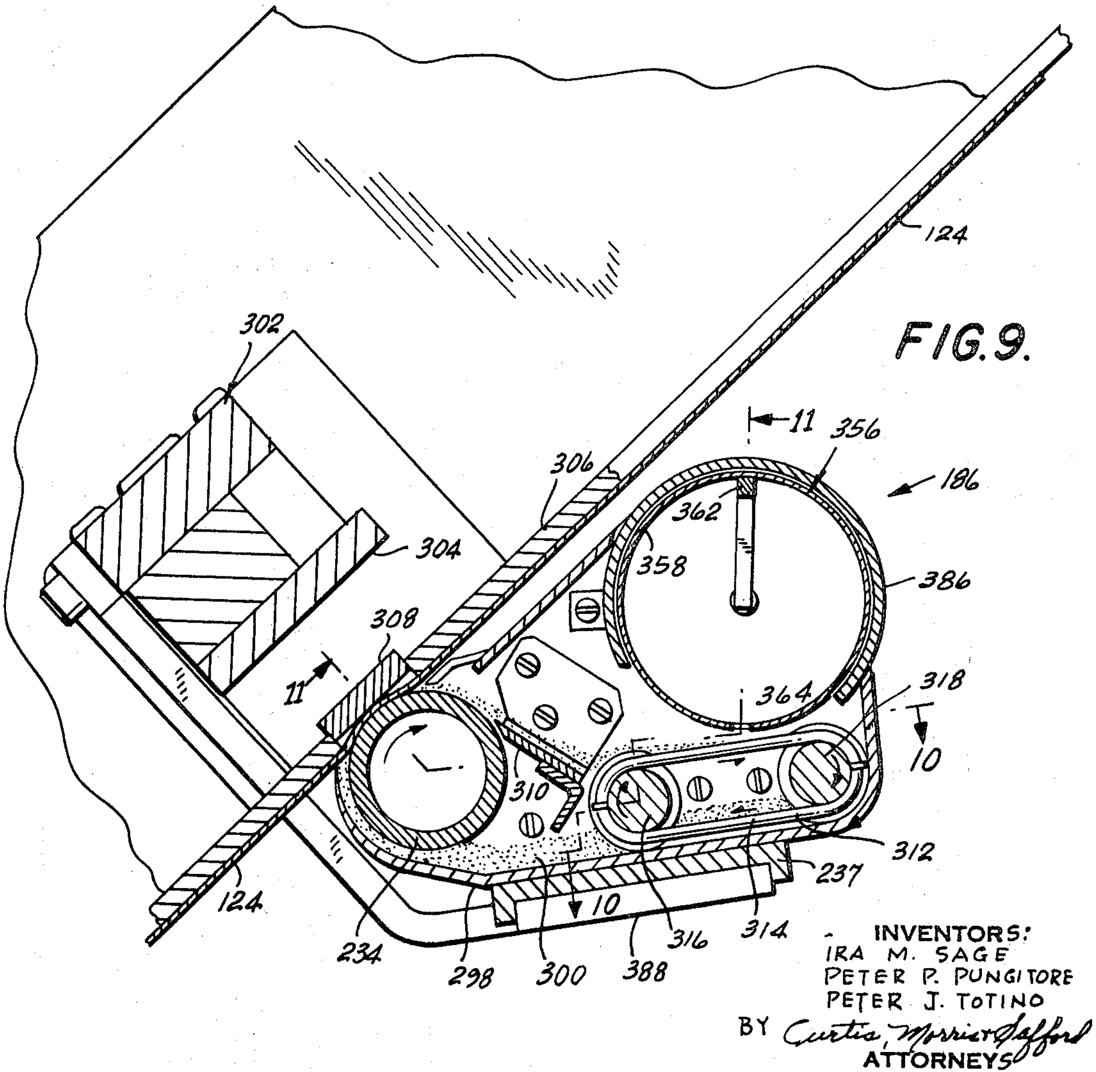
FIG. 9 is a cross-sectional, partially schematic view of the developer mechanism of the present invention.

Just prior to the start of the paper feed, the developer unit 186 is moved from the position shown in FIG. 2 to the position shown in FIG. 9; that is, it is advanced from its normal position in which its toner-applicator brush member 234 does not contact the paper 124, to position where brush member 234 contacts the paper. Then, after the paper has stopped feeding, the developer unit 186 is retracted to its normal position.

This feature is highly advantageous in that the brush member does not remain in contact with the stationary copy paper between the making of successive copies and, hence, will not cause large over-developed darkened areas that otherwise might occur. In addition, the retraction of unit 186 allows the microfilm image to be projected up to a higher point on the copy paper at printing screen 94, thus allowing the spacing between adjacent copies on the continuous web of copy paper to be minimized.

Figures 7, 7A:
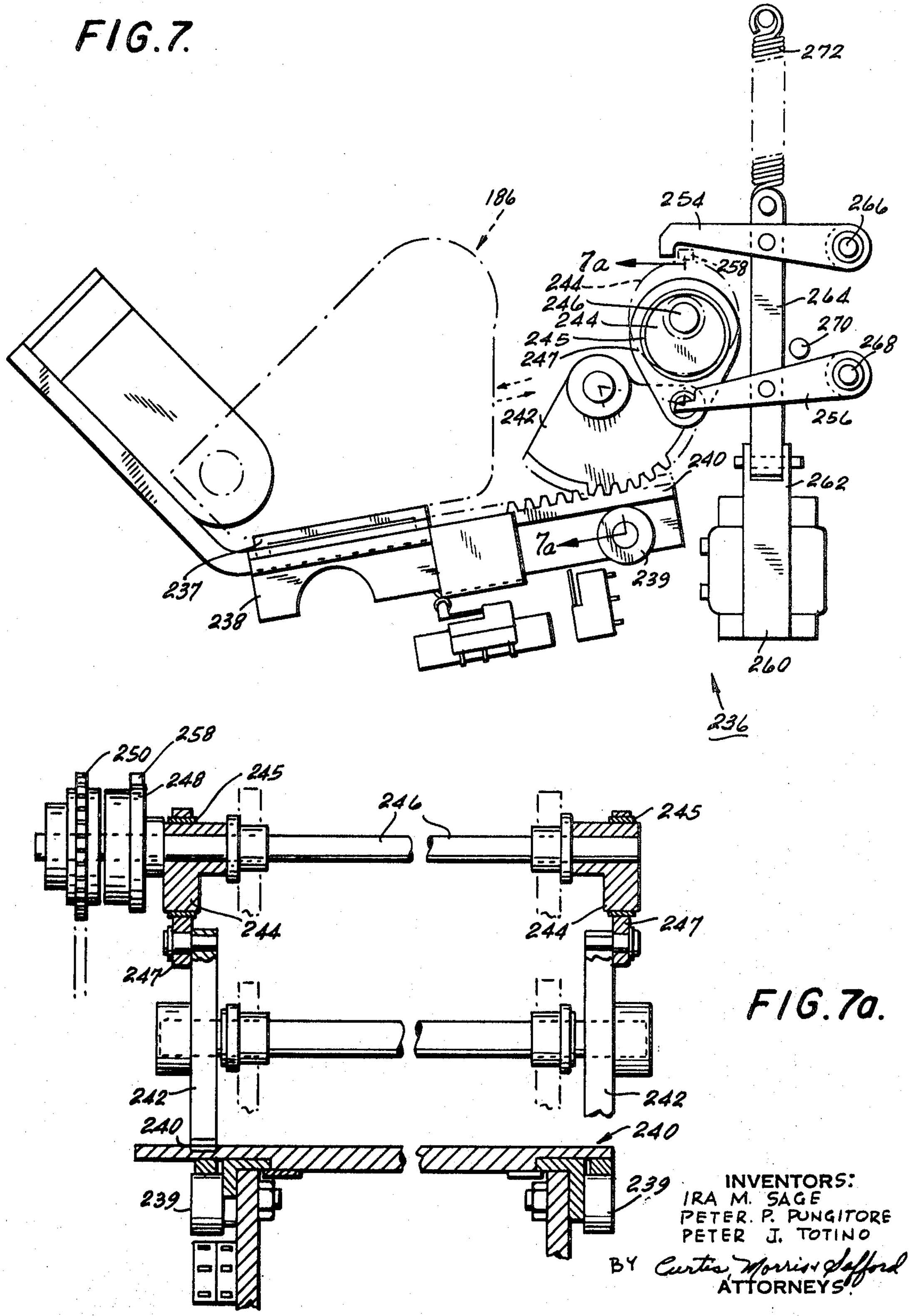
FIG. 7 is a partly schematic detailed elevation view of some of the components of the machine shown in FIGS. 1 and 2.
FIG. 7A is a cross-sectional view taken along line 7A—7A of FIG. 7.

The details of the mechanism 236 used for retracting and advancing the developer unit 186 are shown in FIGS. 7 and 7A. Developer unit 186 is mounted on a channel member 237 on a carriage 238 which slides back and forth on a pair of rollers 239. The carriage 238 has a pair of toothed racks 240 each of which mates with the teeth of a gear sector 242. Each of a pair of cams 244 is secured to a shaft 246 and is pivotally connected to one sector 242 by a connecting member 247 which is rotatably mounted on cam 244 by a bearing 245. A "Tiny" clutch 248 is mounted on shaft 246 and is engagable to couple a sprocket 250 to shaft 246. Sprocket 250 is driven by main drive motor 160 through by a chain 252 (see FIG. 2).

The engagement of clutch 248 is controlled by a pair of pawls 254, 256 which alternately engage the tab 258 of clutch 248 to disengage it. A solenoid 260 has a plunger 262 connected to a bar 264 to which the pawls 254 and 256 are pivoted at their mid-sections. Pawls 254 and 256 are pivoted at one end to the machine frame by pivot pins 266 and 268, respectively. A post 270 serves as a stop to limit the upward motion of pawl 256. A spring 272 normally pulls bar 264 up to its uppermost position. In this uppermost position, pawl 256 engages tab 258 of clutch 248 and maintains the developer unit 186 in its normal position away from the paper. When solenoid 260 is energized, bar 264 is pulled down, releasing the tab 258 of clutch 248 and bringing pawl 254 downwardly to engage tab 258 and disengage the clutch when tab 258 reaches the position shown in FIGS. 7 and 7A. This engages clutch 248 for one half-revolution, driving cams 244 and causing sectors 242 to rotate clockwise and advance developer unit 186 to the copy paper.

When the paper stops feeding, the solenoid 260 is de-energized and the tab 258 is allowed to rotate another half-revolution around to its initial position. This causes gear sectors 242 to rotate counter-clockwise and retract developer unit 186. Thus, cams 244 have been driven one complete revolution in two equal steps, the first step moving the developer unit forward and the second returning it to its initial position.

DEVELOPER UNIT

Figure 8:
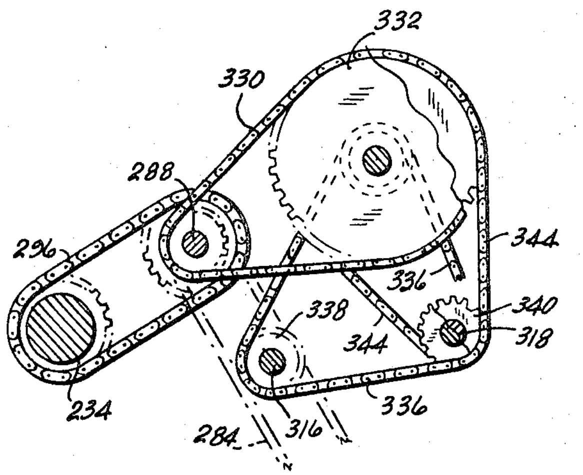
FIG. 8 is a schematic view of the drive arrangement used for actuating the developer mechanism of the apparatus shown in FIGS. 1 and 2.

Referring now to FIGS. 2 and 8, the developer unit 186 is operated by a drive motor 282 and a chain 284 which is connected to a sprocket 286 (see FIG. 11) mounted on a shaft 288. Brush member 234 is driven by means of a sprocket 290 secured to shaft 288, another sprocket 292 secured to a shaft 294 forming a part of brush member 234, and a chain 296 connecting sprockets 290 and 292.

Referring now to FIG. 9, developer unit 186 includes a housing 298 which is secured to channel member 237. A quantity 300 of developer mixture is maintained in the housing 298 and is continuously supplied to brush member 234 by a mixing and feeding web 312 which will be described in greater detail below.

The developer mixture is conventional, and comprises, for example, iron powder particles mixed with relatively smaller particles of thermoplastic pigment material. This pigment or "toner" powder is of the "reversal" type; that is, of a type which is attracted to uncharged areas and repelled from charged areas of the copy sheet. The use of this type of toner is required because the microfilm document images are "negative," and it is desired to make "positive" copies of them.

The brush member 234 is made of ferromagnetic material and is magnetized in a conventional manner by a permanent magnet structure 302. The forward face 304 of permanent magnet structure 302 is spaced from the paper backing plate 306 so that there is room for the magnetic structure 302 to retract with the developer unit 186 as it moved away from the paper 124. As is well known, the iron powder particles in the developer mixture 300 will form "bristles" on the surface of brush member 234, and these bristles will brush against the paper 124 and will give up the developer powder particles to the latent electrostatic image on the copy paper 124.

In accordance with one aspect of the present invention, a section 308 of developer backing plate 306 is recessed so as to form a depression in the plate 306 at the position where brush member 234 approaches it. When the developer unit 186 is advanced, brush member 234 is moved into the depression so that the paper 124 is bent inwardly and makes intimate contact over an area of brush member 234 which is greater than it would be if the paper were flat. This improves the quality of the copy produced.

As the brush 234 rotates past the paper 124, the toner-depleted developer mixture remaining on the brush surface is scraped off by a scraper 310 which guides the mixture onto the moving mixing web 312 which carries the depleted developer mixture rearwardly in housing 298, mixes it with any new toner powder that may be added at that point, stirs it into the body of mixture 300 in the housing 298, and pushes mixture body 300 toward the brush member 234.

Figure 10:
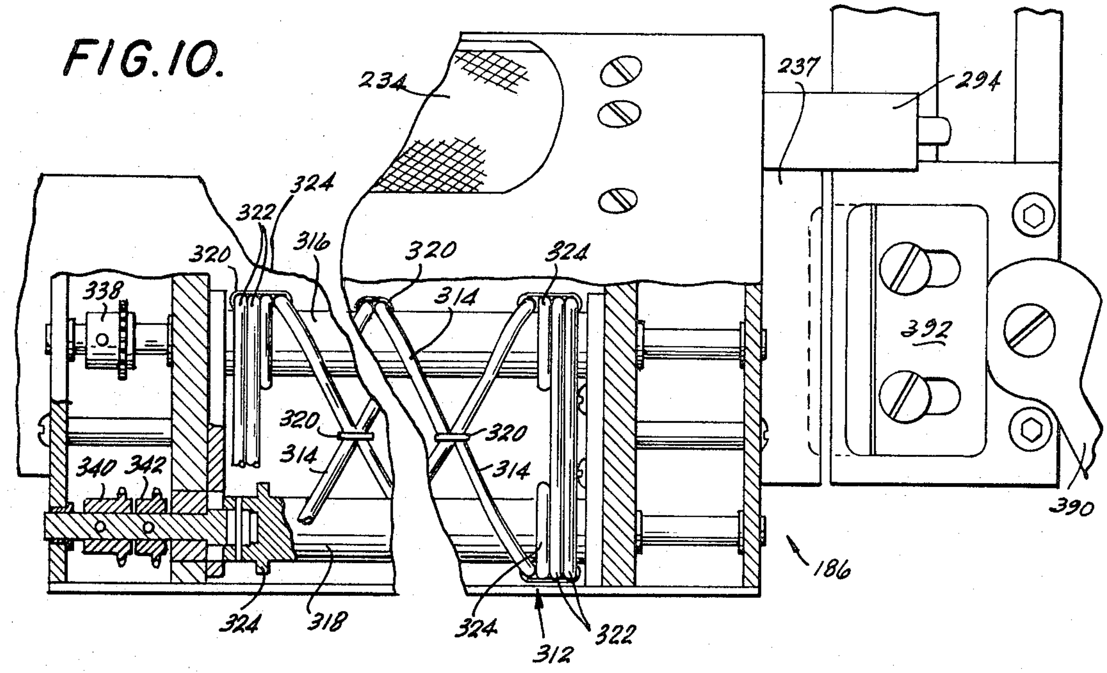
FIG. 10 is a partially broken-away cross-sectional view taken along line 10—10 of FIG. 9.

Referring now to FIG. 10, developer web 312 comprises a number of circular rubber rings 314 each of which is looped around two parallel shafts 316 and 318. Each ring 314 is fastened to the next ring by metal clips 320. Each ring is fastened to the ring on one side at two points approximately 180° apart on the ring and is fastened to the ring on the other side at two points also 180° apart and 90° from the first fastening points. This network is stretched over shafts 316 and 318 and forms a series of interlaced diamond-shaped scoops which effectively mix the developer mixture. A number of parallel rings are fastened together and wound around the ends of shafts 316 and 318. These rings are held in place by a flange 324 near each end of each shaft. This structure holds the ends of web 312 and prevents slipping of the web ends towards its middle.

Figure 11:
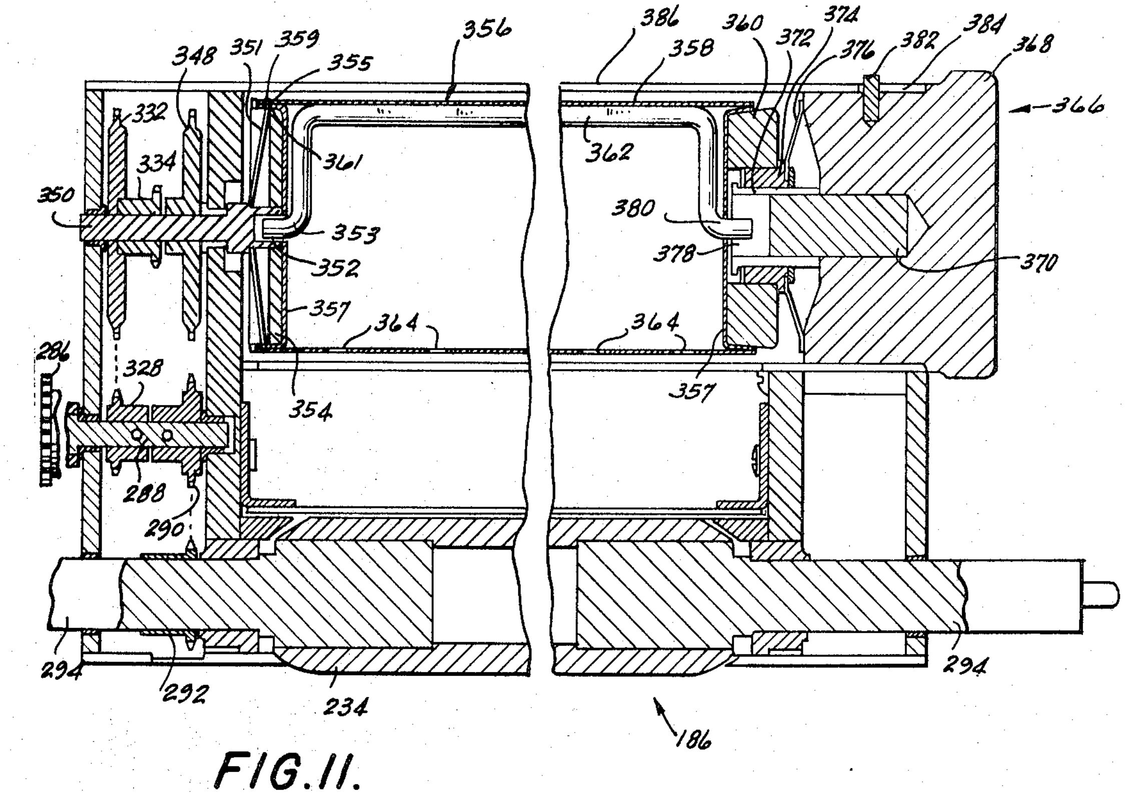
FIG. 11 is a partially broken-away view taken along line 11—11 of FIG. 9.

Referring now to FIGS. 8 and 11, shafts 316 and 318 are driven at a speed around one-third of that of brush 234 by means of a sprocket 328 secured to shaft 288, a chain 330 driving a larger speed-reducing sprocket 332 which drives a smaller sprocket 334. Sprocket 334 is coupled to sprockets 338 and 340 on shafts 316 and 318, respectively, by means of a chain 336. Another sprocket 342 on shaft 318 is connected by means of chain 344 to a large sprocket 348 which drives a shaft 350 at about one-ninth the speed of brush 234 for actuating the toner-adding apparatus, to be described below.

The mixer web 312 is extremely effective in quickly mixing developer and carrier particles and in feeding the mixture to the brush. In fact, it has been found that one revolution of the webbing usually is sufficient to thoroughly mix a moderate quantity of fresh toner powder into the developer mixture. As a result, shafts 316 and 318 can be and are turned at a speed substantially lower than that of brush 234. The result of this, it is believed, is that there is less "fatigue" of the iron power particles; that is, the iron powder particles do not readily lose their ability to pick up and carry toner powder particles and rarely, if ever, need replacing.

Referring now to FIG. 11, a toner-supply cartridge 356 is rotatably mounted in a generally tubular portion 386 of the developer housing. Toner-cartridge 356 is of the throw-away type designed to be used, thrown away, and replaced with another. Cartridge 356 includes a tube 358 preferably made of paper-board, plastic, or other inexpensive material, a pair of plastic end caps 357, and a metallic scraper 362. As is shown in FIG. 11, scraper 362 has a square cross-sectional shape and is bent in the form of a bail so as to scrape against the inside surface of the cylinder. Cylinder 358 has a row of holes 364 along one side.

A cover assembly 366 is provided to seal the toner cartridge 356 into the developer unit. Cover assembly 366 includes a knob 368 with a shaft 370 secured to and extending inwardly from knob 368. A bushing 372 is secured to shaft 370, and a bearing 374 is secured to bushing 372. An adapter 360 is rotatably mounted on bearing 374, and a circular spring 376 abutts the flanged surface of bearing 374 and the inward surface of knob 366 to thrust the cartridge 356 into the housing 386. The inward end 378 of shaft 370 is slotted to mate with and hold the square-shaped end 380 of scraper and prevent it from rotating. A bayonet pin 382 locks into a slot 384 in housing 386 to hold the cover assembly 366 securely in place.

Toner cartridge drive shaft 350 has a hollow end 352 to which is fastened an adapter 354 which couples a drive spring 351 to the shaft. The ends of spring 351 extend beyond the periphery of adapter 354 and fit into slots 355 in the edge of cartridge 356. Spring 351 is drivably connected to adapter 354 by means of tabs 359 which fit into slots 361 in the adapter.

Hollow end 352 of shaft 350 fits loosely around end 353 of scraper 362 so as to allow the scraper to remain stationary while the cartridge rotates. Adapter 354 fits loosely into the end cavity of the cartridge; the drive coupling to the cartridge is made through spring 351 and slots 355.

Toner cartridge 356 provides an extremely convenient way of replenishing developer powder in the developer mixture 300. The cartridge is rotated slowly by shaft 350 while the scraper 362 remains stationary. Every time the row of holes 364 comes adjacent the mixer web 312, a small increment of toner powder is dropped into the web. Web 312 quickly mixes this toner powder with the developer mixture 300 and rubs the carrier and toner particles together to create triboelectric attraction between them. The stationary scraper scrapes the insides of cylinder 356 and prevents holes 364 from becoming clogged.

Toner cylinder 356 is extremely clean to use since a piece of masking or cellophane tape can be placed over the holes 364 until the cartridge is to be used. When it is desired to replace an empty cartridge, the knob 368 is turned and the cover assembly 366 is removed. The old cartridge is withdrawn from the housing and thrown away. The tape is stripped off of the holes 364 in the new cartridge, and the new cartridge is inserted into the housing 386. Then the cover assembly 366 is replaced. Advantageously, the new cartridge need not be aligned by the operator in order to connect it to the drive shaft 350. If the ends of spring 351 are not initially aligned with the slots 355, the spring ends will flex inwardly and then will snap into the slots as the spring rotates.

Thus, the toner supply for the copying machine has been changed effortlessly and cleanly. This is to be compared with conventional manner of adding toner in which fine black powder is poured from a container into a hopper. This conventional procedure spreads toner dust over the machine and its operator.

Referring now to FIG. 10, the surface of brush 234 can be knurled to render it effective to form iron-particle "bristles," but is preferably roughly sand-blasted to achieve this effect. Sand-blasting is less expensive than knurling and produces an excellent brush-bristle forming surface.

Developer unit 186 is easily removable from the reader-copier machine 20. It is mounted on channel member 237 which slides onto a support member 388 (see FIG. 9). As is shown in FIG. 10, a lock-handle 390 is turned to move a lock-plate 392 to the position shown in dashed lines to cover the end of channel member 237 and lock the developer unit 186 in place.

PAPER-CUTTING SYSTEM

Figures 12, 12A:
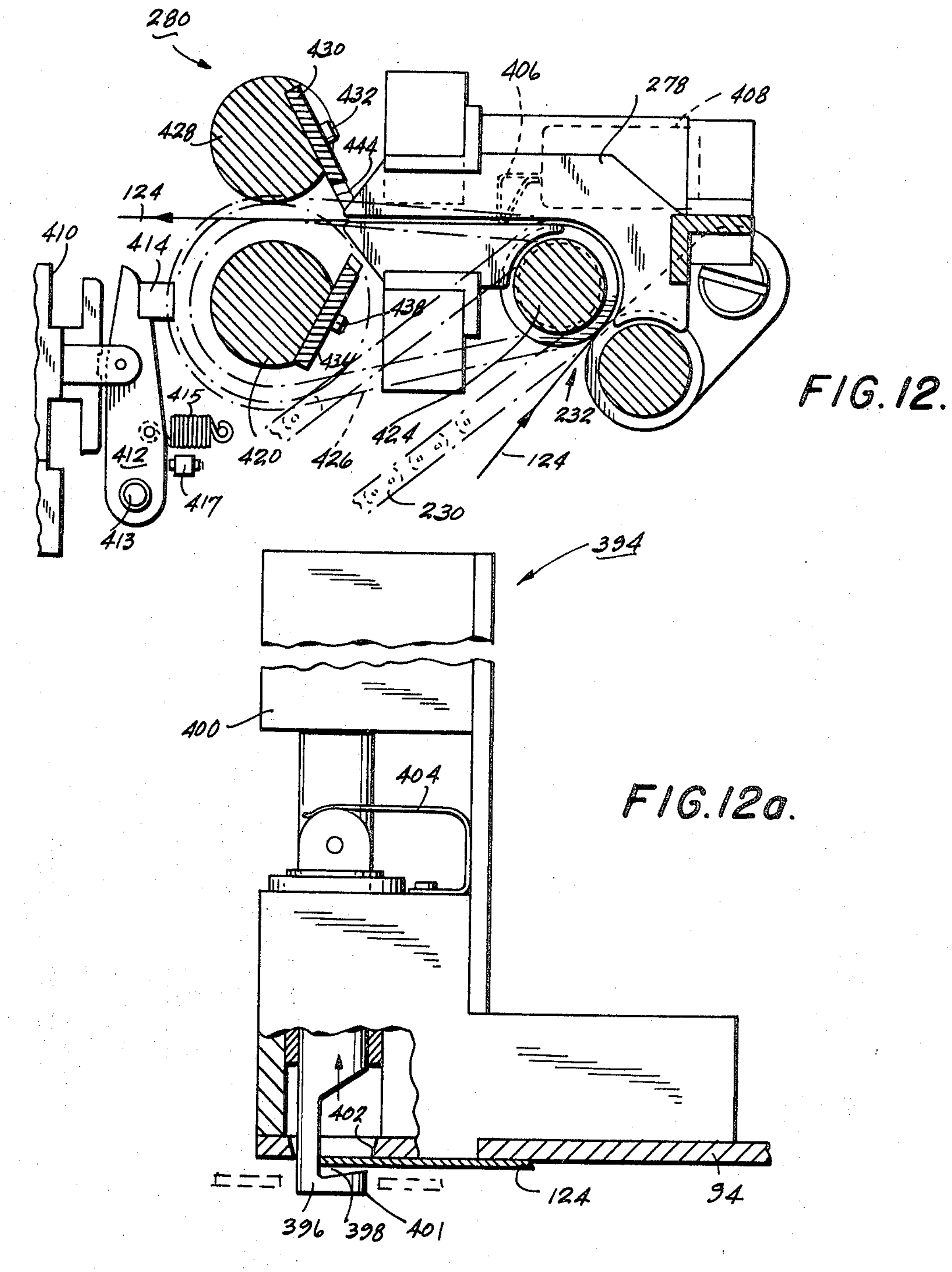
FIG. 12 is a partially cross-sectional, partially schematic elevation view of a portion of the paper-cutting apparatus of the machine shown in FIGS. 1 and 2.
FIG. 12A is a partially cross-sectional elevation view of another portion of the paper-cutting apparatus of the machine shown in FIGS. 1 and 2.

As was mentioned above, switch 48 (FIG. 1) on the front of the machine 20 is pressed in order to cut the paper at the end of a record. This actuates a notching device 394 which is illustrated in FIGS. 2 and 12A. Notching device 394 comprises a solenoid 400 with a plunger 396 having a cut-out portion 398 into which the edge of copy sheet 124 fits. Solenoid 400 lifts plunger 396 upwardly quickly when energized in response to the actuation of switch 48. A notch is cut out of the edge of the paper by shearing between the edge 401 of the plunger 396 and a cutting edge of a metal cutting member 402. A spring 404 returns the plunger 396 downward quickly after switch 48 is released. The notching unit 394 is positioned on the upper portion of screen plate 94 so that the notch is cut in the copy sheet at the end of a copy.

Figures 13, 13A, 14:
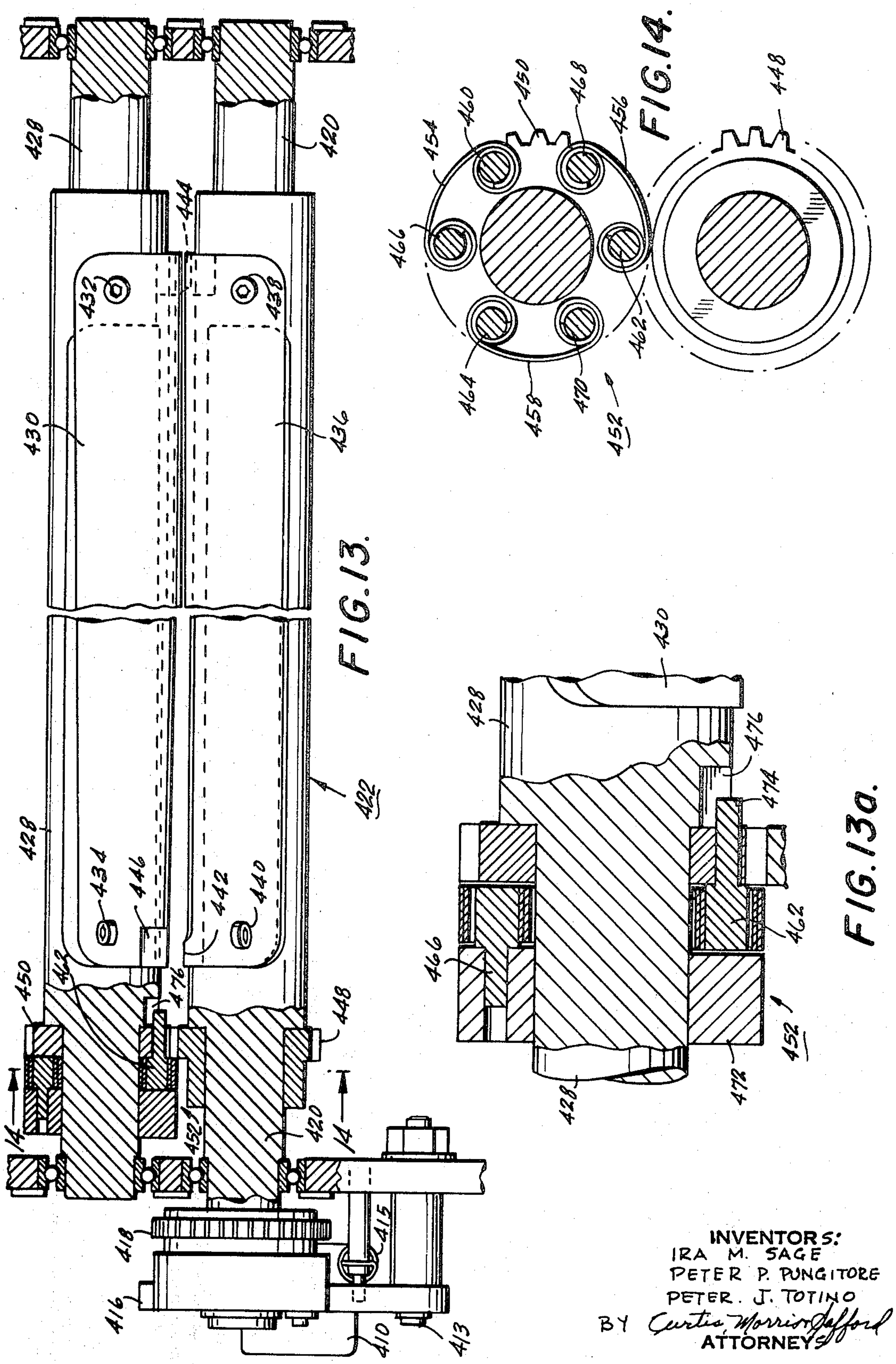
FIG. 13 is a partially cross-sectional partially cut-away elevation view of the paper-cutting apparatus shown in FIG. 12.
FIG. 13A is an enlarged view of a portion of FIG. 13.
FIG. 14 is a cross-sectional view taken along line 14—14 of FIG. 13.

The paper-cutting assembly 280 is shown in FIG. 12. As the paper 124 passes around a guide 278, an arm 406 of a feeler switch 408 drops downwardly into the notch in the edge of the paper. This actuates a solenoid 410 which swings a pawl 412 out of engagement with the tab 414 of a "Tiny" clutch 416 (see FIG. 13). Pawl 412 is pivoted on a pivot 413, and is urged into engagement with tab 414 by a spring 415. A stop member 417 limits the movement of pawl 412. As is shown in FIG. 13, the release of tab 414 causes clutch 416 to engage and couple a sprocket 418 to a shaft 420 forming a part of a knife unit 422. Sprocket 418 is driven by roller shaft 424 (see FIG. 12) by means of a chain 426.

Referring now to FIGS. 12 through 14, knife unit 422 includes a pair of parallel rotatably-mounted shafts 420 and 428. An upper cutting blade is mounted in a cut-out portion of shaft 428 by means of a pair of screws 432 and 434. A lower cutting blade 436 similarly is mounted in a cut-out portion of shaft 420 by means of screws 438 and 440. Each cutting blade is slightly wider at the right end (as shown in FIG. 13) than at the left end. Also, the mounting surface for each blade at its left end is inclined with respect to the mounting surface at its right end so that each blade is given a helical twist, lower blade 436 being twisted clockwise as viewed in the direction of arrows 14, and upper blade 430 being twisted counter-clockwise. Lower blade 436 has an outwardly-extending lobe 442 at its left end beyond its cutting edge. Similarly, upper blade 430 has an outwardly-extending lobe 444 at its right end beyond its cutting edge. A beveled cut-out portion 446 is provided at the left end of upper blade 430 to mate with lobe 442.

When sprocket 418 is clutched to shaft 420 in the manner described above, shafts 420 and 428 are rotated for one revolution in opposite directions, thus bringing the cutting edges of blades 430 and 436 together in a sweeping shearing motion; that is, in a shearing motion that takes place while the blades are "sweeping" or moving with the paper.

Shaft 428 is rotated by means of a spur gear 448 secured to shaft 420 and mating with another spur gear 450 which is coupled to shaft 428 by means of a spring-coupling indicated generally at 452 in FIG. 13 and illustrated in greater detail in FIGS. 13A and 14. Spring coupling 452 includes three flat springs 454, 456 and 458, each of which is coiled into a spiral at both ends. One end of each coil spring is wound around a post 460, 462 or 464, respectively, which is mounted upon spur gear 450. The other end of each spring is coiled around a post 466, 468 or 470, respectively, which is secured to shaft 428 by means of an annular member 472. As is best shown in FIG. 13A, the right end 474 of pin 462 fits into a slot 476 in shaft 428. There is substantial room for pin end 474 to move circumferentially within slot 476, thus giving considerable "play" between gear 450 and shaft 428. The three springs 454, 456 and 458 urge the cutting edges of blades 430 and 436 together to ensure clean paper-cutting, but, because of their flexibility, do not cause the blades to bind together or wear excessively.

The knife unit 422 is highly advantageous for cutting a moving paper web. The shearing action is created by the rotation of two shafts which are driven by the same drive system which feeds the paper through the unit. Thus, the shearing blades move or "sweep" along with the paper as they are cutting it and thereby prevent the paper from gathering in folds and clogging in the cutting assembly 280. What is more, the knife blades sweep the cut copy as they move along and eject it from the machine, thus avoiding the necessity of providing an additional set of drive rollers. Furthermore, the lobes 442 and 444 which make initial and final contact between the blades, and the spring coupling arrangement 442 insure that the blades will not clash against one another and will remain sharp for long periods of time. Thus, knife unit 422 is a trouble-free device for cutting copy paper while it is in motion and moving the cut copies out of the copying apparatus.

SERIAL-NUMBERING SYSTEM

Figures 15, 16:
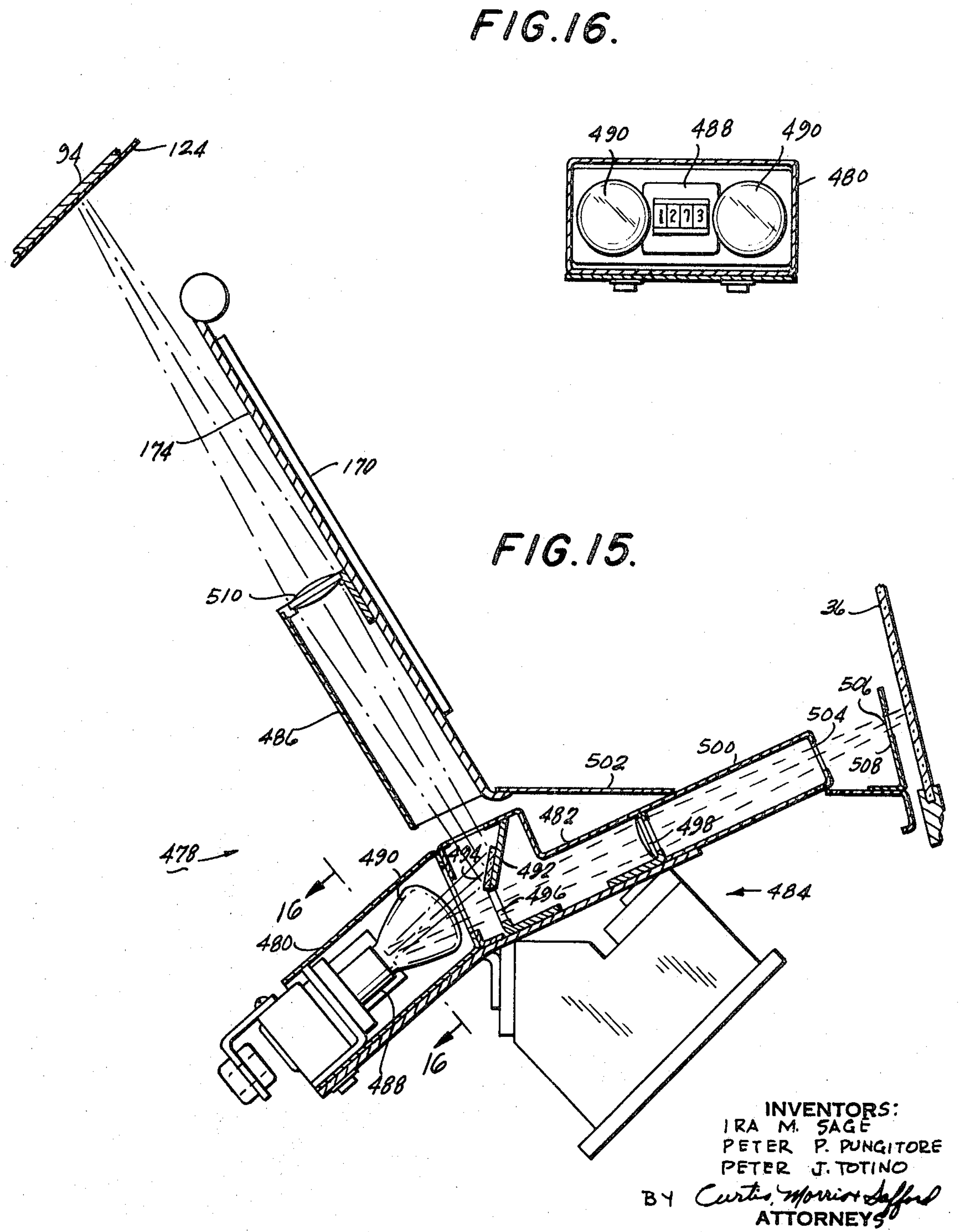
FIG. 15 is a partially cross-sectional elevation view of apparatus forming a part of the machine shown in FIGS. 1 and 2.
FIG. 16 is a cross-sectional view taken along line 16—16 of FIG. 15.

FIGS. 15 and 16 show a serial-numbering assembly 478 which is used to place an identifying serial number on copies made in the reader-copier 20. Numbering assembly 478 is not shown in FIG. 2 because of lack of room in that figure.

Numbering assembly 478 includes a first housing 480 and a second housing 482 which are mounted in reader-copier 20 by means of support structure indicated at 484. A light shield 486 is mounted on the rear surface of support 174 for mirror 170.

Referring now to FIG. 16 as well as FIG. 15, a "Veeder-Root" counter 488 is mounted in housing 480 with a pair of lamps 490 mounted at its sides. Light from the lamps illuminates the number appearing on the face of the counter 488, and the image of the number is reflected outwardly to a baffle plate 492 in housing 482. Baffle plate 492 has a mirror 494 and an opening 496. Mirror 494 reflects the image upwardly and opening 496 allows the image to pass straight through a lens 498 in a tube 500 which projects through a hole in the lower shield 502 of the reader-copier 20. The number image passes through an opening 504 in the end of tube 500, an opening 506 in shield 508, and is displayed upon viewing screen 36.

When swingable mirror support 174 is in the position shown in FIG. 15, the number image is reflected upwardly by mirror 494, passes through lens barrel 486 and lens 510, and is projected upon copy sheet 124 at printing screen 94. In this manner, the image of the number appearing on the counter 488 is projected simultaneously on viewing screen 36 and copy sheet 124 to be printed. When plate 174 is in its rearmost position, the number image does not reach copy paper 124.

ELECTRICAL CONTROL CIRCUIT

Figure 17:
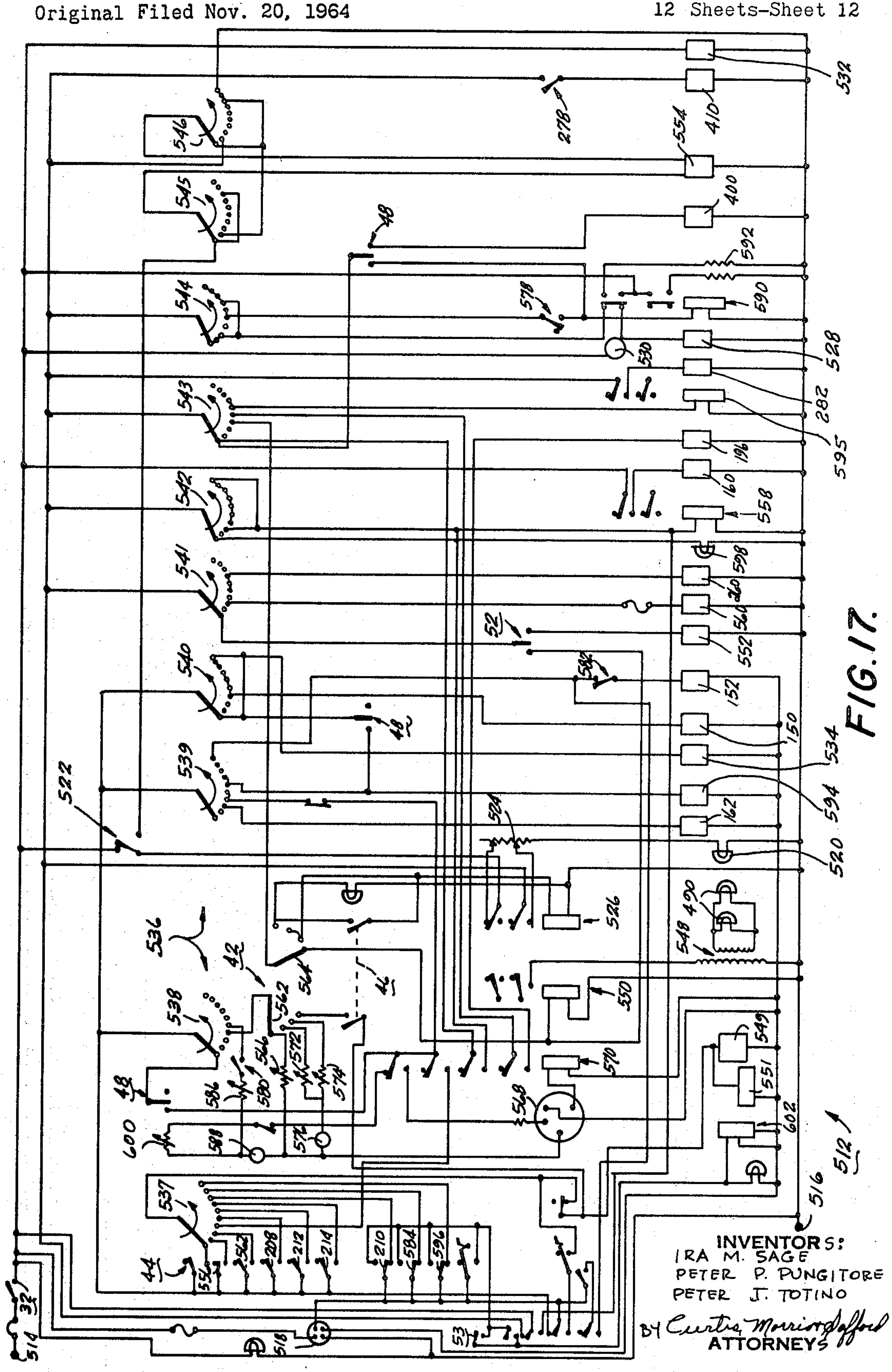
FIG. 17 is a schematic diagram of the electrical control circuit of the machine shown in FIGS. 1 and 2.

The electrical control circuit for the reader-copier 20 is indicated at 512 in FIG. 17. The electrical control switches are illustrated both in FIG. 1 and in FIG. 17. The way in which the switches are used was related above in the initial part of this description. The operation of control circuit 512 now will be explained by describing what happens when each control switch is actuated by the operator.

Pushing on-off switch 32 to turn the machine "on"

Standard alternating current is applied to input terminals 514 and 516. When on-off switch 32 is pushed to the "on" position, the following takes place:

(1) Full-wave rectifier 518 is energized. It supplies direct current to the various relays and solenoids of the circuit.

(2) The projector lamp 520 is energized through switch 522, variable resistor 524, and a power relay 526. Switch 522 is located on mirror support plate 174 (FIG. 2) and is normally closed when the plate 174 is in its rear-most position. Variable resistor 524 is used to vary the voltage applied to the projector lamp.

(3) Fuser blower motor 528 is energized through a relay 590. Motor 528 drives a blower which blows cooling air over the fuser to prevent it from overheating. A thermostat 530 senses the temperature near the fuser and energizes blower motor 528 wenever the blower is not energized and the fuser gets too hot.

(4) Blower motor 532 is energized to drive the blower which cools the projector lamp 520.

(5) Solenoid 534 (see FIG. 2) which is used to automatically focus the lens in the projector assembly 28 on the screen 36.

(6) A stepping switch 536 having ten levels, 537 through 546, is positioned at its "zero" or starting position. Stepping switch 536 provides the switching between various steps or functions of the automatic and manual copying processes.

Pushing switch 52 to view or advance the serial number

When rocker switch 52 is pressed upwardly to view the number appearing on the Veeder-Root counter 488 (FIGS. 15 and 16), counter illumination lamps 490 are energized through a step-down transformer 548 and a relay 550. This projects an image of the counter number on the lower portion of the viewing screen 36.

Pushing switch 52 downwardly (FIG. 1) energizes a solenoid 552 which advances the count on counter 488 by one number.

Pressing automatic "print" switch 44 to make a copy

When the masking bar 38 has been positioned to mark the portion of the document to be copied, the operator presses the automatic print switch 44 to make a copy. This advances the contact arm of each level of stepping switch 536 to the next contact to the right (hereinafter referred to as the "first" contact). This stepping is performed by a coil 549 protected by a spark protector 551. This gives the following results:

(a) With stepping switch 536 in the first position:

(1) The focusing solenoid 534 is de-energized.

(2) Mirror motor 554 is energized and starts moving the projection mirror 170 forward. This causes switch 522 to open.

(3) Projection lamp 520 is de-energized when switch 522 opens.

(4) Mask brake 150 (see FIG. 3) is energized to lock the mask 140 in position.

(5) When the mirror 170 reaches its forward position, it closes a switch 556 which causes the contacts of stepping switch 536 to be advanced to the second position.

(b) With switch 536 in its second position:

(1) Mirror motor 554 is de-energized.

(2) Relay 558 is energized, and in turn supplies main drive motor 160 (see FIG. 2) with alternating current.

(3) High-voltage supply 560 is energized; it supplies high voltage energy to the charger unit 122.

(4) Charger clutch 162 (see FIG. 3) is energized. Clutch 162 now moves charger 122 downwardly along print screen 94 in the arrangement described above in which only a single pass the charger is used to charge the copy paper.

(5) Switch 562 is located at the front edge of mask 140. It is closed when it is hit by charger 122 when it reaches the end of its charging pass. This moves the contact arms of stepping switch 536 to the third position.

(c) With switch 536 in its third position:

(1) The following arc de-energized: relay 558 and main drive motor 160; high voltage source 560; and fuser blower motor 528.

(2) When the four-position selector switch 42 (FIG.1) is in the "automatic numbering position," both of its contacts 562, 564 contact the first (farthese left) contact. In this position, relay 550 is energized through contact arm 564 and serial-numbering lamps 490 are lighted to project a serial number onto the copy paper. Also, an electrical signal is sent through contact arm 562 and variable resistor 566 to a conventional timing circuit 568 which actuates a relay 570 after the copy paper has been exposed to the number image for an exposure time which is set by variable resistor 566. The closing of the contacts of relay 570 then move the contact arms of stepping switch 536 to the fourth position.

(3) With the contact arms 562 and 564 of selector switch 42 set at either the second or third positions ("long" or "short" exposure time, for automatic copy making), an electric signal is sent through one of variable resistors 572 or 574, through a photocell 576 which samples the light emitted by projector lamp 520, and into timing circuit 568. Projector lamp 520 is energized through contact arm 564 of selector switch 42.

Photocell 576 is an element of a standard densitometer arrangement for automatically sensing and timing the exposure required. The exposure time also is controlled by the resistance setting of variable resistors 572 and 574. After the copy paper has been exposed to the document image for the proper length of time, relay 570 is energized and the stepping switch 536 is moved to its fourth position.

(d) With switch 536 in its fourth position:

(1) The following are de-energized: relays 570 and 550, and, if they are energized, numbering lamps 490.

(2) Developer unit advance solenoid 260 (see FIG. 7) is energized to move the developer unit into contact with the copy paper.

(3) Relay 558 and main drive motor 160 are energized.

(4) The movement of developer unit 186 towards the copy paper closes switches 578 and 580 and opens switches 582 and 584. When switch 580 is closed an electrical signal is sent through a fuser warm-up timing arrangement which consists of a variable resistor 586, a thermistor 588 and timing circuit 568. The simultaneous closing of switch 578 actuates a power relay 590 and energizes the twin heating elements 592 of the fuser 276 (see FIG. 2) to start it warming-up to a proper fusing temperature. Thermistor 588 senses the temperature of fuser elements 592 and, together with variable resistor 586 and timing circuit 568, controls the amount of time the fuser is allowed to warm up before paper is fed through it.

(5) When the fuser has warmed up sufficiently, a signal is sent to relay 570 which energizes solenoid 196 (see FIG. 6) which releases the drive clutch for paper-feed control unit 184 (see FIG. 4) and starts paper-length cams 204 and 206 rotating.

(6) Cam 204 first closes switch 208 which moves the contact arms of stepping switch 536 to the fifth position.

(e) With switch 536 in the fifth position:

(1) Relay 570 and solenoid 196 are de-energized.

(2) Paper feed clutch 594, located on main drive motor 160, is energized to cause main drive motor 160 to drive the paper-feed rollers and start feeding the paper. Also, relay 595 is energized to energize developer drive motor 282.

(3) Switch 212 is closed by cam 206 after the cam has rotated a distance proportional to the length of the paper copied. This moves stepping switch 536 to its sixth position.

(f) When switch 536 is in its sixth position:

(1) Relay 590 and fuser elements 592 are de-energized just before the paper stops feeding.

(2) Fuser blower motor 528 is energized to cool the fuser rapidly and prevent scorching of the copy paper next to it.

(3) Switch 214 is closed by cam 206 (see FIG. 5) to move stepping switch 536 to its seventh position.

(g) With switch 536 in its seventh position:

(1) Paper feed clutch 594 is de-energized and the paper stops feeding.

(2) Mask brake 150 (see FIG. 3) is de-energized to free the mask 140 for the next copying operation.

(3) Developer-advance solenoid 260 (see FIG. 7) is de-energized, and switches 578 and 580 are opened, while switches 584 and 582 are closed by the retraction of developer unit 186 away from the copy paper. Also, relay 595 and developer drive motor are de-energized.

(4) The focusing solenoid 534 is energized to refocus the microfilm image on the vewing screen 36.

(5) Mirror 532 is energized, returns the mirror 170 to its rearward position thus closing switch 522, de-energizing mirror motor 532, and energizing the projection lamp 520, thus preparing the reader-copier machine for viewing documents on viewing screen 36.

(6) Cam 204 (FIG. 4) closes switch 210 which switches stepping switch 536 to its eight position.

(h) With switch 536 in its eight position, switch 584 is still closed and the switch 536 is stepped to its ninth position.

(i) With switch 536 in its ninth position:

(1) Charger clutch 152 (FIG. 3) is energized to return the charger 122 to the top of the printing screen 94.

(2) When charger 122 reaches the top of print screen 94, it closes a switch 596 which returns stepping switch 536 to its initial or zero position, thus preparing the control circuit for another copying cycle.

(j) When switch 536 returns to its zero position, relay 558 and main drive motor 160 are re-energized, and a lamp 598 is energized to illuminate print button 44 from the inside to indicate to the operator that the machine is ready for another copying cycle.

Pressing switch 48 to cut or feed-out a copy

When rocker switch 48 is pushed upwardly to cut a copy after it is completed, this energizes solenoid 400 of notching unit 394 (FIG. 12A) and notches the paper in the manner described above. Note that solenoid 400 cannot be energized unless stepping switch is at its zero position; that is, it cannot be energized when the copying apparatus is printing.

When the notch in the paper passes under arm 406 of switch 278 (FIG. 12), switch 278 closes and solenoid 410 is energized to actuate the knife unit 422 to cut the paper in the manner described above.

When switch 48 is pressed downwardly to feed a copy out of the machine, the paper feed clutch 594 on drive motor 160 is energized. Relay 590 and fuser elements 592 are energized, and current is supplied through the variable resistor 600 to thermistor 588 to set the warm-up time of the fuser. After the required warm-up time, relay 570 is energized and in turn energizes relay 558 which starts the main drive motor to start the paper feeding out of the machine. When the paper has been cut, or when no more paper feed is desired, the operator releases switch 48 and de-energizes the drive motor, fuser and paper-feed clutch.

It should be understood that rocker switches 48, 52 and 53, and switches 44 and 46, all shown in FIG. 1, are closed only as long as they are held in by the operator. Only on-off switch 32 and selector switch 42 remain in position when released by the operator.

Pressing reset switch 53

Reset switch 53 is pressed if, during a printing cycle, the developer unit 186 is not in proper position, or if the paper length cams, charger, or stepping switch do not operate properly and it is desired to start the printing cycle all over again. Pressing switch 53 energizes relay 602 which closes appropriate switches to recycle the equipment and return the stepping switch 536 to its initial position.

The above description of the invention is intended to be illustrative and not limiting. Various changes or modifications in the embodiments described may occur to those skilled in the art and these can be made without departing from the spirit or scope of the invention as set forth in the claims.

We claim:

1. In a microfilm reader-printer including means for selectively projecting an enlarged image of a document from microfilm onto either a viewing screen or a printing surface, a counter giving a visual display of a number, said counter being separate from said microfilm and being capable of being actuated to change the number in said display by a predetermined amount, means for illuminating said visual counter display and projecting an image of it onto said printing surface to be printed onto a copy, and means for projecting said image onto said viewing screen misatulenously with its projection onto said printing surface.

2. A reader-printer as in claim 1 including means for selectively disabling said means for projecting said image onto said printing surface.

3. A reader-printer as in claim 2 in which said disabling means comprises means movable to a first position to focus said image on said printing surface, and movable to a second position to shield said printing surface from said image.

4. A reader-printer as in claim 1 including means for reflecting said image through an angle to one of the viewing screen and printing surfaces, the other of said surfaces being positioned directly in line with said counter to receive its image directly.

References Cited

UNITED STATES PATENTS

| | | | |
|---|---|---|---|
| 3,080,802 | 3/1963 | Friedel | 95—4.5 |
| 3,115,815 | 12/1963 | Friedel | 95—4.5 |

NORTON ANSHER, Primary Examiner

R. A. WINTERCORN, Assistant Examiner

U.S. Cl. X.R.

95—4.5, 12; 355—40, 45